United States Patent [19]

Murasugi

[11] Patent Number: 4,720,003

[45] Date of Patent: Jan. 19, 1988

[54] LOCK-UP TORQUE CONVERTER HAVING CLUTCH SLIP CONTROL DEVICE

[75] Inventor: Takashi Murasugi, Yokohama, Japan

[73] Assignee: Nissan Motor Co., Ltd., Yokohama, Japan

[21] Appl. No.: 836,412

[22] Filed: Mar. 5, 1986

[30] Foreign Application Priority Data

Mar. 11, 1985 [JP] Japan .................................. 60-48044

[51] Int. Cl.⁴ .................. F16D 47/02; B60K 41/02
[52] U.S. Cl. .................. 192/0.076; 192/0.096; 192/3.3; 192/3.31
[58] Field of Search .............. 192/0.032, 0.034, 0.075, 192/0.076, 0.077, 0.096, 3.3, 3.31

[56] References Cited

U.S. PATENT DOCUMENTS

| | | | |
|---|---|---|---|
| 2,568,007 | 9/1951 | Jandasek | 192/3.3 |
| 2,672,767 | 3/1954 | Schneider | 192/3.3 |
| 3,237,734 | 3/1966 | Jania | 192/0.032 |
| 3,966,031 | 6/1976 | Peterson, Jr. et al. | 192/3.3 |
| 3,972,397 | 8/1976 | Cheek | 192/3.3 |
| 4,002,228 | 1/1977 | Borman | 192/3.3 |
| 4,169,526 | 10/1979 | Malloy | 192/3.3 |
| 4,560,043 | 12/1985 | Murasugi et al. | 192/3.31 |

FOREIGN PATENT DOCUMENTS

| | | |
|---|---|---|
| 59-747 | 1/1984 | Japan . |
| 2081413 | 2/1982 | United Kingdom . |
| 2122287 | 1/1984 | United Kingdom . |
| 2142392 | 5/1984 | United Kingdom . |
| 2150656 | 10/1984 | United Kingdom . |

*Primary Examiner*—Rodney H. Bonck
*Assistant Examiner*—David A. Testardi
*Attorney, Agent, or Firm*—Schwartz, Jeffery, Schwaab, Mack, Blumenthal & Evans

[57] ABSTRACT

A clutch slip control device for a lock-up torque converter has a clutch slip control valve and an operating range detecting valve which are operative to control a lock-up control pressure in a lock-up control chamber based upon a torque pressure representative of a torque transmitted by a turbine runner and upon a governor pressure and a throttle pressure representative of a vehicle speed and an engine load.

2 Claims, 9 Drawing Figures

LOCK-UP TORQUE CONVERTER HAVING CLUTCH SLIP CONTROL DEVICE

BACKGROUND OF THE INVENTION

1. Field of the Invention

The present invention relates in general to lock-up torque converters and more particularly to a device for controlling relative rotation, i.e., slip between input and output elements of a lock-up torque converter.

2. Description of the Prior Art

Since the torque converter is adapted to transmit power by way of working fluid, relative rotation between the input and output elements is inevitable, resulting in a lowered power transmission efficiency. For this reason, there have been heretofore proposed, as disclosed by U.S. Pat. No. 4,002,228 and Japanese Patent Publication No. 59-747, a clutch slip control technique for controlling the above described relative rotation in accordance with the turbine torque of the torque converter (i.e., torque transmitted by the turbine hub) and, as disclosed by U.S. Pat. No. 4,169,526, a clutch slip control technique for controlling the above described relative rotation in such a manner that the ratio of the turbine torque and the torque transmitted by the clutch is maintained constant. The aforementioned clutch slip control techniques, however, have not met with entirely satisfactory results. In some cases, the techniques cause undesirable noise, vibration, and a decrease in fuel efficiency.

SUMMARY OF THE INVENTION

In accordance with the present invention, there is provided a novel and improved lock-up torque converter which comprises input and output elements rotatable relative to each other, clutch means disposed between the input and output elements and responsive to first fluid pressure for direct driving connection therebetween, and valve means for controlling the first fluid pressure in response to second fluid pressure representative of relative rotation between the input and output elements and third and fourth pressures representative of at least one kind of clutch slip control factors.

The above structure is quite effective for overcoming the above noted disadvantages and shortcomings inherent in the prior art devices.

It is accordingly an object of the present invention to provide a novel and improved lock-up torque converter having a clutch slip control means which can control clutch slip without excess and deficiency.

It is another object of the present invention to provide a novel and improved lock-up torque converter of the above described character which can effect a desired clutch slip control characteristic which cannot be attained by the prior art clutch slip control techniques.

It is a further object of the present invention to provide a novel and improved lock-up torque converter of above described character which is quiet in operation while improving the fuel consumption of an associated vehicle.

BRIEF DESCRIPTION OF THE DRAWINGS

The features and advantages of the lock-up torque converter according to the present invention will become more clearly appreciated from the following description taken in conjunction with the accompanying drawings, in which.

DETAILED DESCRIPTION OF THE PREFERRED EMBODIMENT

Figure 1:
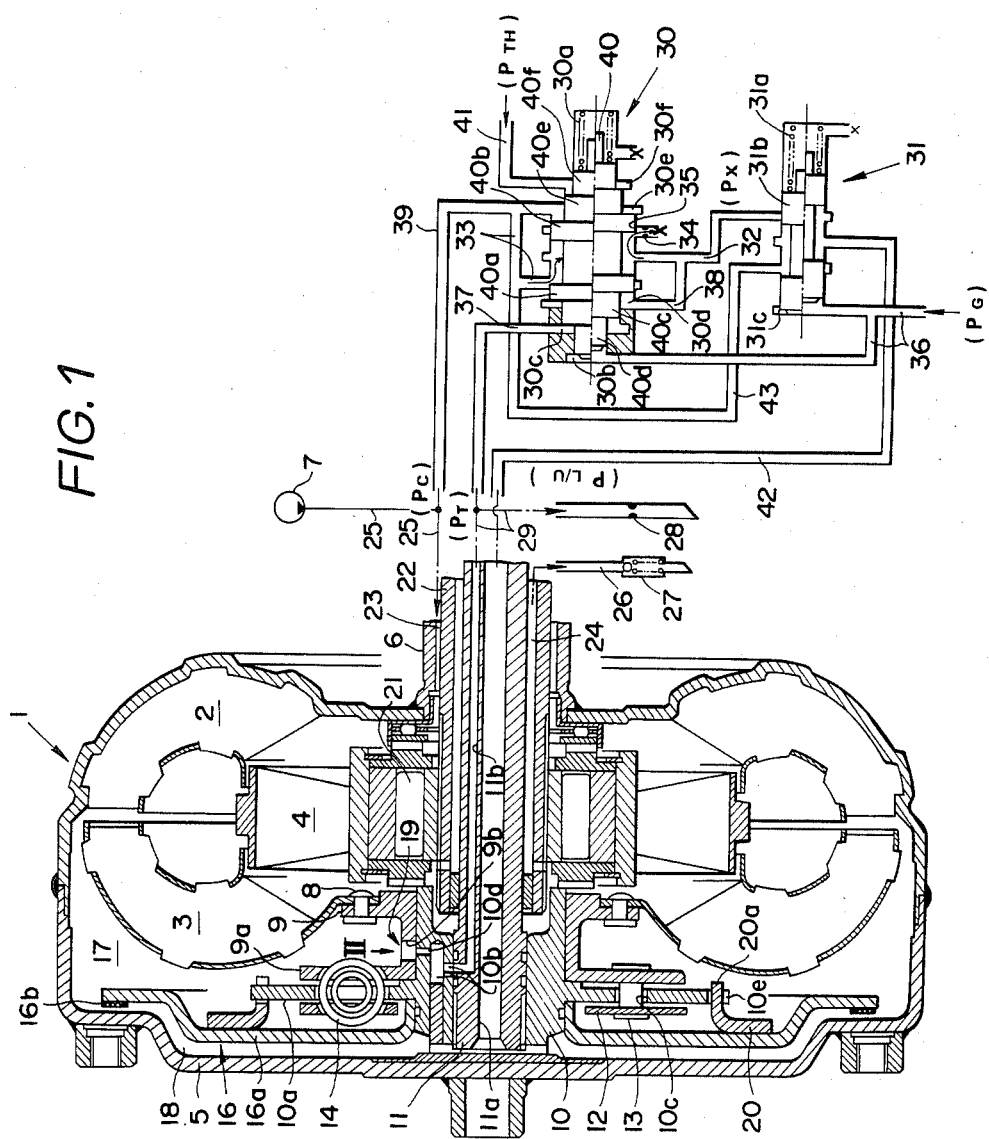
FIG. 1 is a longitudinal sectional view of a lock-up torque converter equipped with a clutch slip control device according to the present invention.

In FIG. 1, a lock-up torque converter is generally indicated by the reference numeral 1 and shown as including a pump impeller (torque converter input element) 2, turbine runner (torque converter output element) 3 and stator 4. The pump impeller 2 has welded thereto a converter cover 5 and is drivingly connected therethrough to a crankshaft of an engine (not shown) so as to be driven to rotate at all times when the engine is in operation. The pump impeller 2 has further welded thereto a hollow pump drive shaft 6 and drives therethrough a pump 7 at all times when the engine is in operation.

The turbine runner 3, which cooperates with the pump impeller 2 to form a toroidal fluid circuit, has rivetted thereto by rivets 8 at the inner circumferential periphery a turbine hub 9 and is rotatably mounted therethrough on a sleeve 10. The sleeve 10 is splined to a torque converter output shaft 11. The turbine hub 9 and the sleeve 10 are respectively formed with integral flanges 9a and 10a which extend radially outward while being opposed axially to each other. An annular plate 12 is installed on the flange 10a on the side thereof opposite to the flange 9a. The flange 9a and the annular plate 12 are integrally connected to each other by rivets 13 which are in turn movably received in corresponding holes 10c of the flange 10a so as to allow relative rotation between the flanges 9a, 10a and therefore between the turbine hub 9 and the sleeve 10. The flanges 9a, 10a and the annular plate 12 are respectively provided with windows (no numeral) which are aligned with each other. Outer springs 14 receiving therein inner springs 15 are disposed in the windows in such a manner as to extend circumferentially of the flanges 9a, 10a and the annular plate 12, whereby to resiliently and drivingly interconnect the flanges 9a, 10a. The length of the inner springs 15 in an unloaded state is set to be smaller than that of the outer springs 14. The outer springs 14 urge the turbine hub 9 and the sleeve 10 toward the positions where relative rotation thereof is zero and are compressed increasingly as the relative rotation increases. The inner springs 15 increase the spring constant of the outer springs 14 when the relative rotation becomes larger than a certain value.

Figures 2A, 2B, 2C:
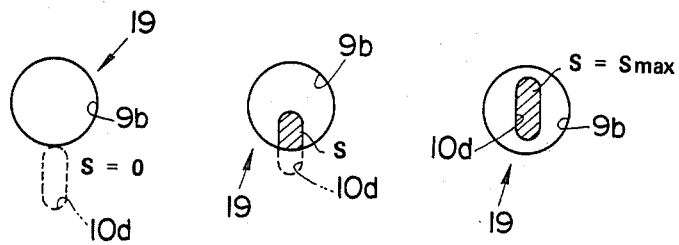
FIGS. 2A-2C are views showing operations of a variable opening orifice employed in the slip control device when viewed in the direction of arrow II in FIG. 1.

A lock-up clutch 16 includes a clutch plate 16a slidably mounted on the sleeve 10 and a clutch facing 16b secured to the clutch plate 16a so that when the clutch plate 16a is pressed at the clutch facing 16b against the converter cover 5, there is defined therebetween a lock-up control chamber 18 fluidly separated from a converter chamber 17. The lock-up control chamber 18 is communicated with a passage 11a formed in the torque converter output shaft 11. The converter chamber 17 is communicated through a hole 9b formed in the turbine hub 9 and a slit 10d formed in the sleeve 10 with a passage 11b formed in the torque converter output shaft 11, and the hole 9b and the slit 10d constitute a variable opening restriction or orifice 19 the opening degree S of which is, as hatched in FIGS. 2B and 2C, variable depending upon the overlapping amount relating to the relative positions of the turbine hub 9 and the sleeve 10.

The clutch plate 16a has secured thereto an annular member 20 of an L-shaped cross section which is formed at the free end thereof with teeth 20a engaged with teeth 10e formed at the outer circumferential periphery of the flange 10a, whereby the clutch plate 16a is drivingly connected to the sleeve 10 in such a manner as to be movable axially thereon.

The stator 4 is mounted on a hollow stationary shaft 22 by way of a one-way clutch 21, and between the shaft 22 and the pump drive shaft 6 and between the shaft 22 and the torque converter output shaft 11 there are respectively defined annular passages 23, 24. A working fluid from the oil pump 7 is introduced to the inside of the torque converter 1 through the annular passage 23 and a passage 25 and drains the working fluid from the torque converter through the annular passage 24 and a passage 26. A relief valve 27 is disposed in the passage 26 to maintain the pressure in the inside of the torque converter 1, i.e., the pressure in the converter chamber 17 at a constant value (converter pressure) $P_C$. Further, the passage 11b is connected to a passage 29 having a fixed opening restriction or orifice 28 so that the converter pressure $P_C$ in the converter chamber 17 is partly drained through the variable opening orifice 19 and the passages 10b and 11b and through the passage 29 and the fixed opening orifice 28. Accordingly, a torque pressure (pressure representative of turbine torque) $P_T$ is developed in the passage between the variable opening orifice 19 and the fixed opening orifice 28 that is determined by the difference in the opening area of the both. The torque pressure $P_T$ therefore varies based upon the opening degree S (refer to FIG. 2) of the variable opening orifice 19. By the way, upon increase of the torque transmitted by the turbine runner 3, i.e., upon increase of the output torque of the torque converter 1, the variable opening orifice 19 allows the hole 9b to move relative to the slit 10d from the position shown in FIG. 2A to the position shown in FIG. 2B or FIG. 2C to increase the opening degree S, and upon decrease of the output torque of the torque converter 1, the relative displacement is caused in the opposite direction to reduce the opening degree S, resulting in that the torque pressure $P_T$ (pressure representative of torque) varies in response to the torque converter output torque (turbine torque), i.e., in response to the clutch slip amount, as for example shown in FIG. 3.

The clutch slip control device is constituted by a clutch slip control valve 30 and an operating range detecting valve 31. The clutch slip control valve 30 includes a valve spool 40 resiliently held by a spring 30a in a position shown in the upper half part of FIG. 1 and, when in that spool position, establishes communication between a passage 32 and a passage 33 while, when in the spool position shown in the lower half part of the drawing, establishes communication between the passage 32 and a drain passage 35 provided with an orifice or restriction 34. To this end, the valve spool 40 is provided with lands 40a, 40b located adjacent each other. There are provided to the valve spool 40 and arranged in sequence leftwardly from the land 40a in the drawing smaller diameter portions 40c, 40d, and there are provided to the valve spool 40 and arranged in sequence rightwardly from the land 40b in the drawing smaller diameter portions 40e, 40f.

Figure 5:
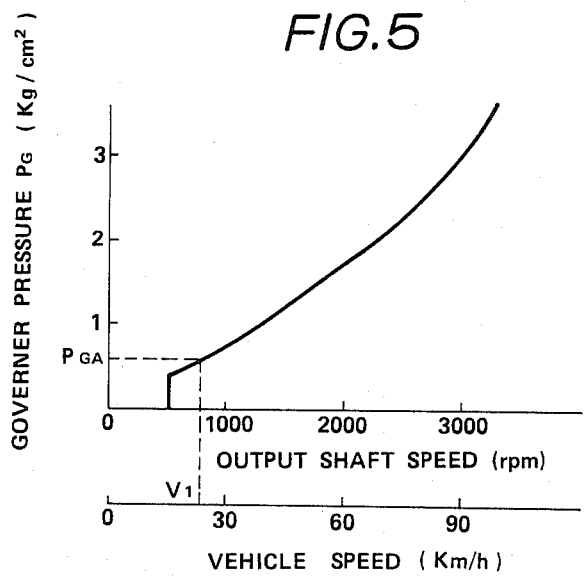
FIG. 5 is a graph showing a characteristic curve of a governor pressure as a function of an rpm of a torque converter output shaft and a vehicle speed.
Figure 6:
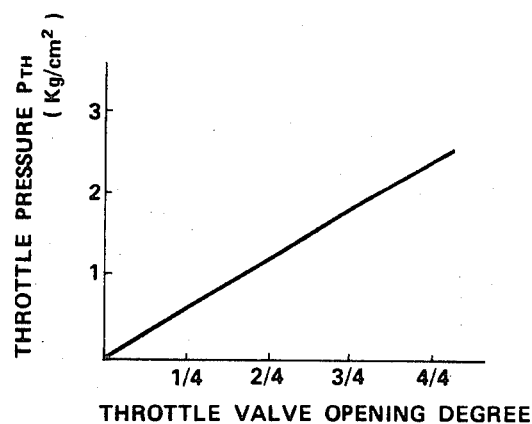
FIG. 6 is a characteristic curve of throttle pressure as a function of a throttle valve opening degree.

A chamber 30b with which the smaller diameter portion 40d is associated is connected to a conduit 36 into which there is introduced a governor pressure $P_G$ that varies depending upon a vehicle speed as for example shown in FIG. 5. A chamber 30c defined between the smaller diameter portions 40c, 40d is connected through a passage 37 to the passage 29 to introduce thereinto a torque pressure $P_T$, while a chamber 30d defined between the land 40a and the smaller diameter portion 40c is connected through a passage 38 to the passage 32 to introduce thereinto a clutch slip control pressure $P_X$. A chamber 30e defined between the land 40b and the smaller diameter portion 40e is connected through a passage 39 to the passage 25 to introduce thereinto a converter pressure $P_C$, and the passage 39 has connected thereto the passage 33. Further, a chamber 30f defined between the smaller diameter portions 40e, 40f introduces from a passage 41 a throttle pressure $P_{TH}$ which varies in response to the opening degree of the throttle valve of the engine (engine load) as for example shown in FIG. 6.

Figure 7:
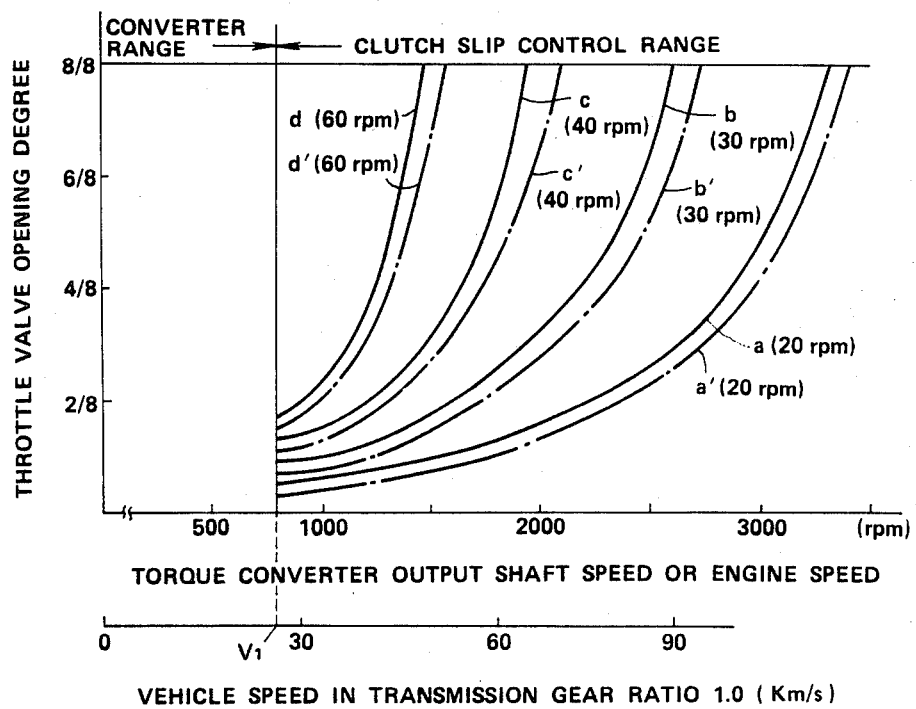
FIG. 7 is a graph showing a clutch slip variation characteristic of the clutch slip control device of FIG. 1.

The operating range detecting valve 31 includes a valve spool 31b resiliently held by a spring 31a in the position shown in the upper half part of the FIG. 1 and, when in that spool position, establishes communication between a passage 42 extending from the passage 11b and a passage 43 extending from the passage 33 for thereby making the lock-up control pressure $P_{L/u}$ in the circuit 42 serve as a converter pressure $P_C$ while, when in the position shown in the lower half part of the drawing, establishes communication between the passage 42 and the passage 32 for thereby making the lock-up control pressure $P_{L/u}$ serve as a slip control pressure $P_X$ regulated by the clutch slip control valve 30 and prevailing in the passage 32. In the meantime, the position of the valve spool 31b is determined based upon the relation between the biasing force of the spring 31a and the force resulting from the governor pressure $P_G$ supplied from the passage 36 to the chamber 31c and, when the governor pressure $P_G$ is smaller than a value indicated by $P_{GA}$ in FIG. 5 which corresponds to a vehicle speed indicated by $V_1$ in FIG. 7 the valve spool 31b assumes a position shown in the upper half part of FIG. 1, while when the governor pressure $P_G$ is higher than that value, the valve spool 31b assumes a position shown in the lower half part of FIG. 1.

The operation of the above described embodiment will be described hereinafter. When the torque converter 1 is operated in a converter range in which the vehicle speed is lower than a predetermined value indicated by $V_1$ in FIG. 7, the operating range detecting valve 31 is put into a condition as shown in the upper half part of FIG. 1 by the effect of the governor pressure $P_G$. By this, the passage 42 is communicated with the passage 43, resulting in that the lock-up control pressure $P_{L/u}$ in the lock-up control chamber 18 is maintained at a value equal to the converter pressure $P_C$ in the converter chamber 17. When this is the case, the clutch plate 16a is not forcedly put into contact with the converter cover 5 and does not perform transmission of power therebetween, i.e., does not limit relative rotation between the input and output elements 2, 3, resulting in that the torque converter 1 performs transmission of power while being held in a converter state in which clutch slip is not limited at all.

Figure 4:
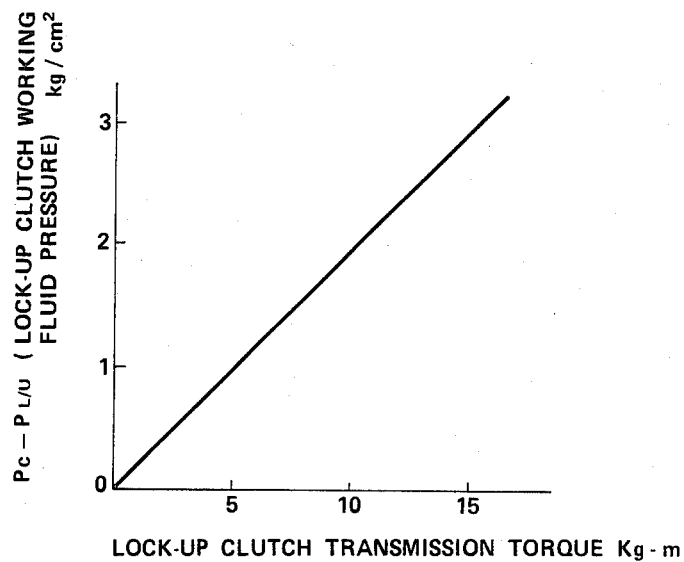
FIG. 4 is a graph showing a characteristic curve of a torque transmitted by a lock-up clutch as a function of a working fluid pressure.

When the torque converter 1 is operated in a clutch slip control range in which the vehicle speed is higher than the value $V_1$, the operating range detecting valve 31 is put into the position shown in the lower half part of FIG. 1 and connects the passage 42 to the passage 32 for thereby making the lock-up control pressure $P_{L/u}$ in the lock-up control chamber 18 be equal to the slip control pressure $P_X$ in the passage 32 and thereby performing clutch slip control of the torque converter 1 under regulation of the pressure $P_X$, i.e., under regulation of the pressure $P_{L/u}$ by the clutch slip control valve 30 in the manner as will be described hereinafter. In this connection, the torque transmitted by the lock-up clutch 16 varies based upon the differential pressure (lock-up clutch working fluid pressure) $P_C - P_{L/u}$ between the converter pressure $P_C$ and the lock-up control pressure $P_{L/u}$ as shown in FIG. 4. However, since the converter pressure $P_C$ is held constant as described above, the torque transmitted by the lock-up clutch 16 can be controlled through control of the lock-up control pressure $P_{L/u}$ only.

In this instance, consideration being made to the forces acting on the valve spool 40 of the slip control valve 30, there respectively act rightwardly in FIG. 1 a governor pressure $P_G$ on the free end of the smaller diameter portion 40d, a torque pressure $P_T$ on the differential pressure receiving area (area B) between the smaller diameter portions 40c, 40d and a slip control pressure $P_X$ on the differential pressure receiving area (area C) between the land 40a and the smaller diameter portion 40c, while there respectively act leftwardly in FIG. 1 a converter pressure $P_C$ on the differential pressure receiving area (the same area as that C described above) between the land 40b and the smaller diameter portion 40e, a throttle $P_{TH}$ on the differential pressure receiving area (area D) between the smaller diameter portions 40e, 40f and a biasing force of the spring 30a on the rightward end of the valve spool 40.

Accordingly, the equation for balance of the forces acting on the valve spool 40 is expressed by:

$$A \times P_G + B \times P_T + C \times P_X = C \times P_c + D \times P_{TH} + F_{sp}$$

From this equation, $$A \cdot P_G + B \cdot P_T = C(P_c - P_X) + D \cdot P_{TH} + F_{sp} \quad (1)$$

In order to satisfy this equation, the valve spool 40 repeats leftward and rightward movements in FIG. 1 and, while so doing, establishes communication between the passage 32 and the passage 33 or the drain passage 35 for thereby regulating the clutch slip control pressure $P_X$.

Figure 3:
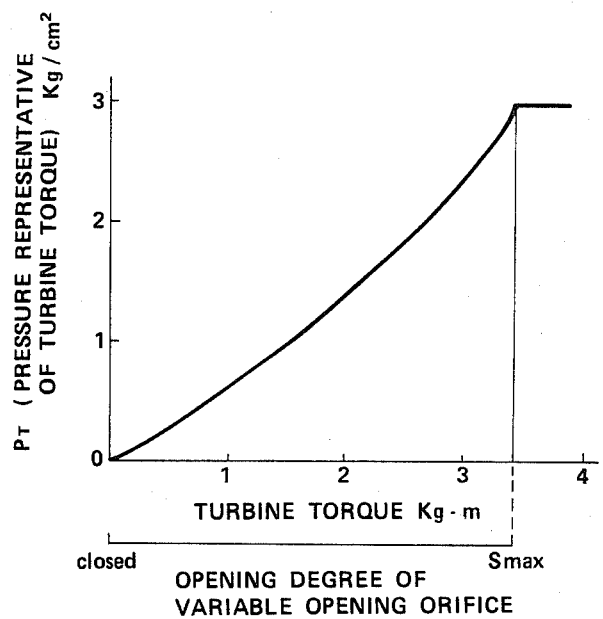
FIG. 3 is a graph showing a characteristic curve of a pressure representative of turbine torque as a function of an opening degree of the variable opening orifice.

In the meantime, the torque pressure $P_T$, as is apparent from FIG. 3, is substantially proportional to the turbine torque $T_T$, the following equation is given.

$$T_T \approx K_1 \times T_1 \quad (2)$$

where $K_1$ is constant of proportionality.

Further, since the torque transmitted by the lock-up clutch 16 is proportional to the differential $P_C - P_{L/u}$ between the converter pressure $P_C$ and the lock-up control pressure $P_{L/u}$ as shown in FIG. 4, and since, when in the slip control range, $P_X = P_{L/u}$, the following equation is given:

$$P_C - P_X = K_2 \times T_L \quad (3)$$

where $K_2$ is constant of proportionality.

Substitution of equation (1) for equations (2), (3) and for $B \times K_1 = B'$, $C \times K_2 = C'$ provides $$A \cdot P_G + B' \cdot T_T = C' \cdot T_L + D \cdot P_{TH} + F_{sp}$$

From this equation, turbine torque $T_T$ is expressed by:

$$T_T = \frac{C'}{B'} \cdot T_L + \frac{D}{B'} \cdot P_{TH} - \frac{A}{B'} \cdot P_G + \frac{1}{B'} \cdot F_{sp} \quad (4)$$

On the other hand, the turbine torque $T_T$ can be expressed as the function of the clutch slip amount $N_S$ and the number of torque converter input or output rotation N, the following equation is given:

$$T_T = f(N_s, N) \quad (5)$$

Accordingly, the slip amount $N_S$ can be found, base on the torque $T_L$ transmitted by the lock-up clutch 16, throttle pressure $P_{TH}$ (throttle valve opening degree) and governor pressure $P_G$ (vehicle speed), from the equations (4), (5). Accordingly, the clutch slip characteristic can be set as for example represented by curves a', b', c' and d' in FIG. 7 as to the slip amounts of 20 rpm, 30 rpm, 40 rpm and 60 rpm. Since the characteristic curves a', b', c' and d' are nearly equal to the curves that are attained by adding an excess slip amount $\Delta N$ (e.g., 20 rpm) to the curves a, b, c and d representing minimum requirement clutch slips of 20 rpm, 30 rpm, 40 rpm and 60 rpm relative to throttle valve opening degree and vehicle speed, respectively, an optimum clutch slip control can be attained according to the present invention.

Further, since throttle valve opening degree S (throttle pressure $P_{TH}$) and vehicle speed (governor pressure $P_G$) are used as factors for control of clutch slip, an actual clutch slip control almost completely matches the characteristic represented by the curves a'-d', making it possible to control clutch slip amount without excess and deficiency and prevent noises and vibrations while improving the fuel consumption efficiently.

What is claimed is:

1. A lock-up torque converter comprising:
   input and output elements rotatable relative to each other;
   clutch means disposed between said input and output elements and responsive to first fluid pressure for direct driving connection therebetween;
   valve means for controlling said first fluid pressure in response to second fluid pressure representative of relative rotation between said input and output elements and third and fourth fluid pressures representative of at least one kind of clutch slip control factors, in which said input element is a pump impeller secured to a converter cover adapted to be driven by a power source and said output element is a turbine runner cooperating with said pump impeller to form a toroidal fluid circuit and said second fluid pressure is representative of torque transmitted by said turbine runner; and a lock-up control chamber in which said first fluid pressure prevails, defined between said converter cover and said clutch means, a converter chamber defined between said clutch means and said turbine runner, first passage means for delivering said second fluid pressure to said valve means, variable opening restriction means variable in opening in response to torque transmitted by said turbine runner for draining fluid in said converter chamber into said first passage means increasingly as the torque transmitted by said turbine runner increases, said first passage means having a branch passage provided with a fixed opening restriction for draining fluid in said first passage means, second passage means for drawing thereinto said first fluid pressure from said lock-up control chamber, third passage means for delivering fluid pressure in said converter chamber to said valve means, second valve means responsive to said fourth fluid pressure for providing communication between said second passage means and said third passage means when said fourth fluid pressure is lower than a predetermined value, said first mentioned valve means having a drain port, and fourth passage means extending between said first mentioned valve means and said second valve means and communicable at the opposed ends thereof with said drain port of said first mentioned valve means and said second passage mean, respectively, said second valve means providing communication between said second passage means and said fourth passage means when said fourth fluid pressure is higher than said predetermined value, said first mentioned valve means selectively providing and obstructing communication between said fourth passage means and said drain port based upon said second, third and fourth fluid pressures.

2. A lock-up torque converter as set forth in claim 1, in which said third fluid pressure is representative of throttle valve opening degree and said fourth fluid pressure is representative of vehicle speed, said third fluid pressure being applied on said valve means in the direction causing increase of said first fluid pressure while said fourth fluid pressure being applied together with said second fluid pressure on said valve means in the direction causing decrease of said first fluid pressure.

* * * * *